March 28, 1961 A. L. SCOTT 2,977,406
STRAIN INSULATOR AND METHOD OF MAKING SAME
Filed Oct. 12, 1956
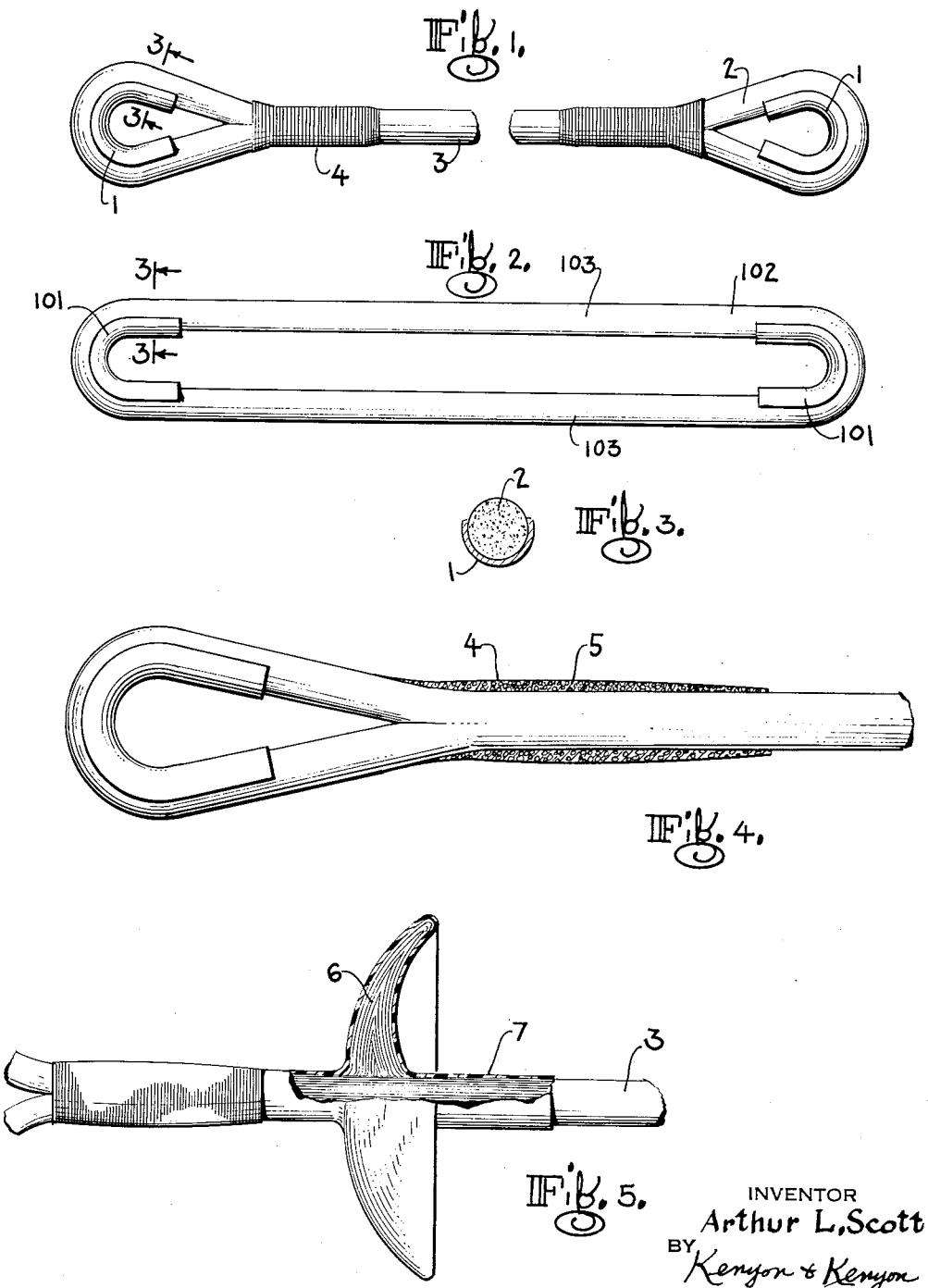
INVENTOR
Arthur L. Scott
BY Kenyon & Kenyon
ATTORNEYS

United States Patent Office 2,977,406
Patented Mar. 28, 1961

2,977,406

STRAIN INSULATOR AND METHOD OF MAKING SAME

Arthur L. Scott, Columbia, S.C., assignor to Columbia Products Company, Columbia, S.C., a corporation of South Carolina Filed Oct. 12, 1956, Ser. No. 615,553

2 Claims. (Cl. 174—177)

This invention relates to strain insulators for use in connection with power lines or the like.

One of the objects of the invention is to provide such a strain insulator capable of resisting extremely high loads in tension.

Another object of the invention is to provide such an insulator which is less bulky than, and lighter in provides adequate insulation, even for extremely high voltages, such as encountered in power lines.

Another object of the invention is to provide such an insulator which is less bulky than, and lighter in weight than, such insulators heretofore employed.

Another object of the invention is to provide such an insulator which can be made simply and inexpensively out of relatively low cost materials.

Another object of the invention is to provide a new and improved method of producing such an insulator.

Other objects and advantages of the invention will be apparent from a consideration of the following specification and the accompanying drawings, in which—

Fig. 1 is an elevational view of one form of insulator embodying the invention hereof;

Fig. 2 is a plan view of another form of such insulator;

Fig. 3 is a detailed sectional view showing a section through either Fig. 1 or Fig. 2 taken on the line 3, 3 thereof;

Fig. 4 is a detailed view, partially in section, of one end of the insulator shown in Fig. 1;

Fig. 5 shows a modification or shield applied to the invention in the form illustrated in Fig. 1.

The strain insulator here involved consists generally of a pair of spaced thimbles adapted to form attaching eyes for the insulator. These thimbles form the terminal ends of the insulator and are connected by a loop of fiberglass which extends around and in the channels of the thimble and which is made up of a single sliver of glass fibers, which sliver is looped a plurality of times around the thimbles, the single sliver thus forming the loop of fiberglass. The individual fibers of the fiberglass are all joined to one another to form the unitary loop by means of a suitable plastic material, which may be any of those materials commonly used for joining fibers of glass together in the manufacture of fiberglass articles. In the finished insulator the individual glass fibers all lie substantially parallel to one another, so that when tension is applied to the insulator substantially the entire tensile strength of the glass fibers is developed.

In making the insulator, the preferred method consists in impregnating the fibers of a sliver of fiberglass which is made up of a plurality of such fibers with the resin or plastic which is to be employed in bonding the fibers together. The sliver is then wound a plurality of times around the thimbles to form the single loop. At this point the resin or plastic has not been set and the loop formed of the sliver of glass fibers is then placed under tension to force the fibers of the loop into the channels of the thimbles to final position. The fibers are then all compacted and held together by any suitable means, and suitable heat or heat and pressure are applied to set the bonding resin or plastic. This results in the forming of an insulator of high strength in which, when tension is applied, there is a minimum tendency for the breakage of the fibers of the glass or the loop which joins the thimbles.

In the form of invention shown in Fig. 1, there are provided a pair of thimbles 1, each of which is channeled at its other periphery to receive a loop 2 of glass fibers. This loop is formed from a single sliver of glass fibers which extends around the thimbles 1 and through their channels a plurality of times so as to, in effect, form an endless loop of fiberglass extending between the thimbles.

The fiberglass is preferably coated with a suitable heat-setting resin prior to the wrapping of the sliver around the thimbles.

In the form of invention shown in Fig. 1, the loop of fiberglass is joined in the center portion of the insulator into a single tension member 3 by bringing the central portions of the loop together and consolidating them, as shown in Fig. 1. A suitable wrapping 4 of fiberglass with a suitable bonding resin, indicated at 5, may be employed to assist in holding the material in position.

In this form of the invention, after the sliver of fiberglass has been wrapped around the thimbles into position and after the central tension member has been formed by consolidating the two flights of the loop between the thimbles, the fiberglass is all consolidated together and tension is applied to firmly seat the portions of the loop which extend around the thimbles in the channels of the thimbles. Consolidation may be effected by wrapping in cellophane tape, which is later removed.

After this has been done, heat or heat and pressure are applied to set the resin, thus joining the individual fiberglass members of the sliver and the loop into a unitary section, each fiber being joined to the next adjacent fiber by the set resin.

In the form of invention shown in Fig. 2, the thimbles 101 are U-shaped and the lop 102 is left open. That is, the two sections of the lop 103 forming the tension members of the finished insulator are not brought together and consolidated into a single tension member.

In the form of invention shown in Fig 5, a molded shield 6 is secured to the central tension member 3. This is preferably in the form of a molded fiberglass disk member provided with suitable attaching sleeves 7.

The insulators of the present invention may be made relatively light in weight compared to strain insulators heretofore used because the fiberglass has extremely high strength in tension. The length of the insulator may be varied to suit the conditions encountered in service, and when formed as above described the insulators are not bulky and are extremely easy to handle.

The fiberglass has the proper dielectric and insulating properties for the purpose, and the resins selected for use are likewise of high insulating characteristics. They may be polyesters or epoxies or any of the other similar resins.

The insulators are also extremely resistant to corrosion encountered on exposure to the atmosphere.

It will be apparent that the present invention may be embodied in other specific forms without departing from the spirit or essential attributes thereof. It is therefore desired that the present embodiments be considered in all respects as being illustrative and not restrictive, reference being had to the appended claims to indicate the scope of the invention.

I claim:

1. A strain insulator comprising a pair of spaced thimbles joined together by a loop of fiberglass comprising a continuous sliver of fiberglass looped a plurality of times around said thimbles with the individual fibers extending parallel to one another, and all under identical tension both in the flights between said thimbles and where they extend around said thimbles, whereby tension applied to said strain insulator will be uniformly distributed between said fibers and whereby shifting of said fibers where they extend around the thimbles will be eliminated when tension is applied to said strain insulator, and binder material joining said fibers to one another and maintaining them in fixed tensioned position with relation to the thimble and in intimate contact with and tensioned around said thimbles.

2. The method of forming a strain insulator which comprises a pair of spaced channeled thimbles and a loop of fiberglass therearound, comprising placing said thimbles in spaced relation to one another and wrapping a single continuous sliver of glass fibers around said thimbles a plurality of times to form a single loop and forcing said thimbles apart and thereby applying equal tension to each of the said glass fibers and forcing them into intimate contact with said thimbles and thereby giving the insulator its final shape and joining said fibers to one another and fixing them in position both between the thimbles and in contact with the thimbles where they pass around the thimbles by a suitable resin and setting said resin while said fibers are maintained under tension.

References Cited in the file of this patent

UNITED STATES PATENTS

| | | |
|---|---|---|
| 1,006,040 | Alsberg | Oct. 17, 1911 |
| 1,167,125 | Sloper | Jan. 4, 1916 |
| 2,859,936 | Warnken | Nov. 11, 1958 |

FOREIGN PATENTS

| | | |
|---|---|---|
| 646,277 | Great Britain | Nov. 15, 1950 |
| 1,097,785 | France | Feb. 23, 1955 |

UNITED STATES PATENT OFFICE
CERTIFICATION OF CORRECTION

Patent No. 2,977,406 March 28, 1961

Arthur L. Scott

It is hereby certified that error appears in the above numbered patent requiring correction and that the said Letters Patent should read as corrected below.

Column 1, line 21, for "less bulky than, and lighter in" read -- relatively light in weight and which --; column 2, lines 40 and 41, for "lop", each occurrence, read -- loop --.

Signed and sealed this 8th day of August 1961.

(SEAL)
Attest:

ERNEST W. SWIDER
Attesting Officer

DAVID L. LADD
Commissioner of Patents